No. 734,455. PATENTED JULY 21, 1903.
E. J. BERG.
SPEED INDICATOR FOR ELECTRIC MOTORS.
APPLICATION FILED MAR. 27, 1902.
NO MODEL.
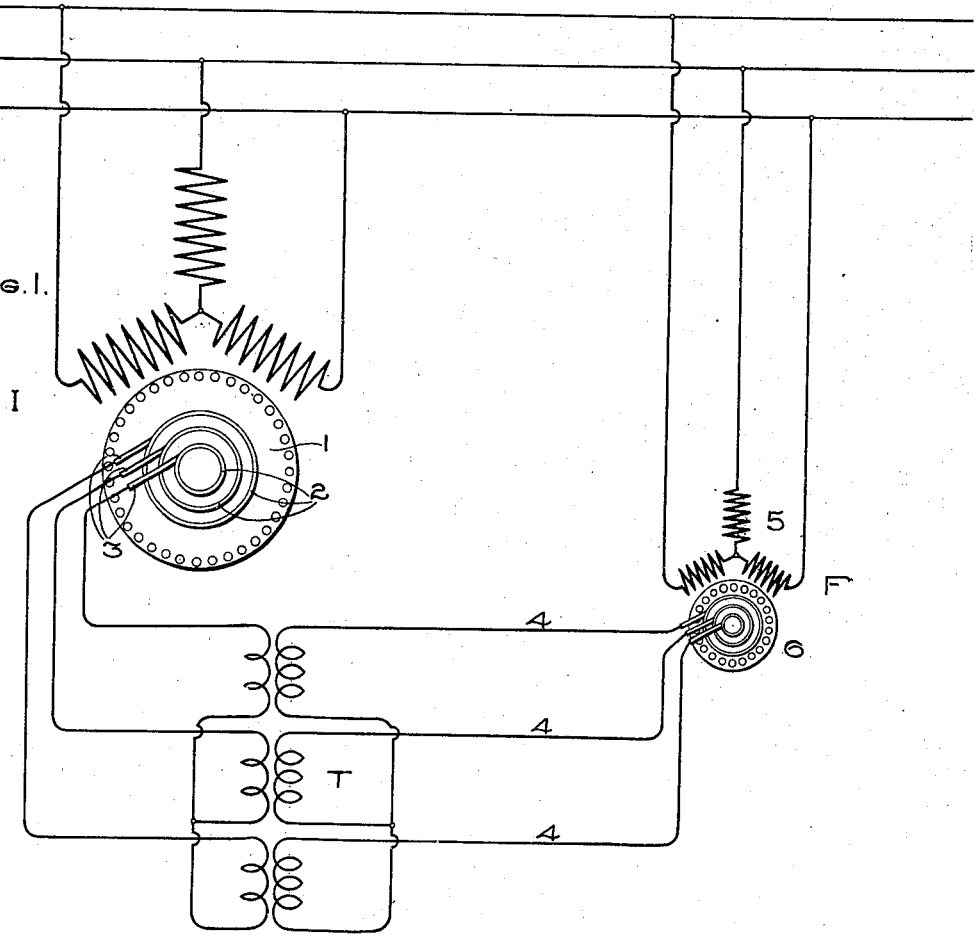
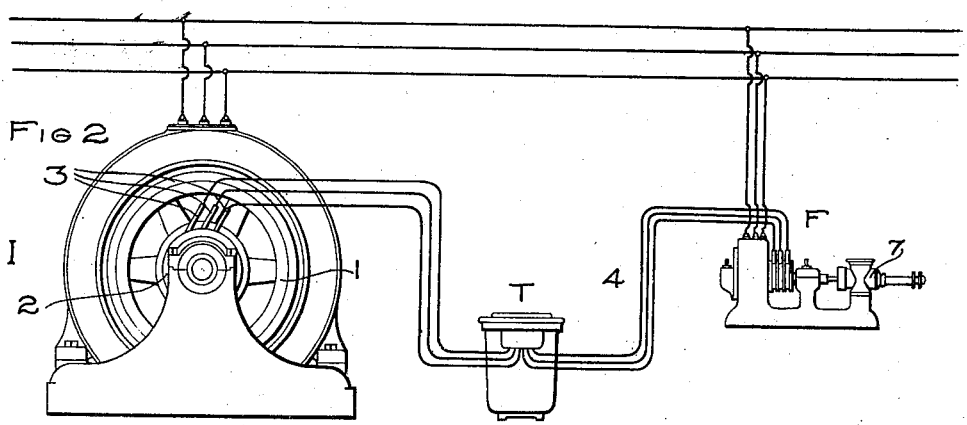
WITNESSES
Harry H. Tilden
Helen Orford
INVENTOR
Ernst J. Berg.
by Albert G. Davis
Att'y No. 734,455. Patented July 21, 1903.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

SPEED-INDICATOR FOR ELECTRIC MOTORS.

SPECIFICATION forming part of Letters Patent No. 734,455, dated July 21, 1903.

Original application filed August 24, 1898, Serial No. 689,373. Divided and this application filed March 27, 1902. Serial No. 100,194. (No model.)

*To all whom it may concern:*

Be it known that I, ERNST J. BERG, a citizen of the United States, residing at Schenectady, county of Schenectady, State of New York, have invented certain new and useful Improvements in Speed-Indicators for Electric Motors, (a division of my prior application, Serial No. 689,373, filed August 24, 1898,) of which the following is a specification.

In the operation of induction-motors it is well known that the speed drops as the load increases. This drop in speed may be considerable in some instances without being seriously detrimental. In some cases, however, a drop in speed as great as two or three per cent. is not permissible, and this is particularly true in cases where induction-motors are used for running cotton or other textile machinery where even a slight speed variation may have a very destructive influence. In order to fulfil the requirement of close speed regulation thus called for, it is necessary to make the motors very large, in which case they become very expensive in proportion to the amount of power developed. Instead of providing large motors with close regulation the same object may be accomplished by using smaller or less expensive motors and preventing too great a drop in speed by correspondingly speeding up the generators in the power-station. To do this, it is necessary to have some method for indicating either the speed or drop in speed of the motor in the receiving-station.

The uses to which such a method may be put are many and various, so that for purposes of illustration I have described only one relation in which my invention is of value.

In the drawings, Figure 1 is a diagrammatic representation of my invention, and Fig. 2 is a view of one form of apparatus which I employ.

In carrying out my invention for indicating at a distance the speed of an induction-motor I make use of the fact that currents are developed in the induced member of the motor of a frequency corresponding to the slip, or, in other words, to the difference between the actual speed of the motor and that which it would have at absolute synchronism. By tapping the windings of the induced member at suitable intervals currents may be taken off of a frequency corresponding to the slip. If these currents be conducted to any desired point and the frequency of the currents there measured, a result is obtained indicative of the speed of the induction-motor.

In the drawings, I represents the induction-motor the speed of which is to be measured. The induced member 1 of the motor is tapped at points separated from each other by an angle equal to one-third of the polar pitch. Three-phase currents are taken off through collector-rings 2 and brushes 3. Owing to the low frequency at which these currents are generated, their voltage may be too low to economically run the frequency-indicator F. To remedy this objection, a step-up transformer T of any suitable character may be employed. The secondary mains 4 lead to the frequency-indicator F, which, as before stated, may be located at any desired point.

The frequency-indicator may assume many forms without departing from the spirit of my invention; but the form which I prefer to employ and which I have illustrated in the drawings consists of a motor of the rotary-field type, in which one member, 5, is fed with polyphase current of the same frequency as that fed to the motor whose speed is to be measured, while the other member, 6, is fed with current from the step-up transformer T, the latter current, as before stated, having a frequency dependent upon the slip of the motor. It is within my invention, however, to construct the frequency-indicator in the form of a synchronous motor in which the field is fed by direct current from any suitable source. In this case the speed of the frequency-indicator corresponds to the slip of the induction-motor.

In the normal operation of the preferred form of frequency-indicator F, in which both members are supplied with energy from the same mains, the polar lines produced in its two relatively rotatable members will coincide, and the speed of the revolving member will be such as to accomplish the result. Thus if the polar lines have the same direction of rotation in space then the revolving member will have a speed less than that of synchronism by an amount equal to the slip of the motor I. In other words, the speed of the frequency-indicator F is the same as that of the motor whose speed is to be measured, so that all that is necessary in order to determine the speed of the motor I is to measure the speed of rotation of the revolving member of the frequency-indicator F. This may be done by a tachometer 7 of any suitable character or by any other known means for measuring the rate of rotation of a shaft. The reading of the tachometer gives the speed of the motor I. If the number of poles on the frequency-indicator F and the motor I differ, this reading will require to be increased or decreased accordingly; but in any case it will be proportional to the speed to be measured.

If the polar lines of the two relatively rotatable elements of the frequency-indicator F revolve in opposite directions, then it is evident that the revolving member will rotate at a rate equal to the sum of the rates of rotation of the polar lines—that is, at a speed equal to the speed of synchronism plus that corresponding to the slip of the motor I. The reading of the tachometer minus a constant corresponding to the speed of synchronism gives the slip of the motor I. Either method of speed-measurement may be employed as convenience may dictate.

If it be desired to measure the variation in speed of the machine from the speed corresponding to synchronism, it is necessary to obtain two readings from the frequency-indicator, one with the two polar lines revolving in the same direction, the other with the two polar lines revolving in the opposite direction. One reading represents the speed of synchronism minus the slip of the machine whose speed is to be measured, while the other reading represents the speed of synchronism plus the slip. One-half of the difference between these readings obviously represents the variation in speed from synchronism of the machine whose speed is being measured. The mean of the two readings gives, of course, the speed of synchronism. In order to reverse the direction of rotation of the polar lines in either of the two members of the frequency-indicator in order to obtain these two readings, it is only necessary to transpose the connections of two of the leads supplying current to that member. Although I have described two methods of measuring the speed of an induction-motor, one of which gives directly either the exact speed of the rotating member or a multiple thereof, while the other gives a result corresponding to the speed of synchronism plus a quantity equal to the slip or drop in speed of the motor, I prefer ordinarily to employ that method of speed-measurement which gives directly the speed of the motor rather than resort to a method which presupposes a knowledge of the speed of synchronism, since this speed cannot be definitely known unless specially measured. It is obvious, nevertheless, that the methods of speed-measurement described by me other than that which I prefer are equally within my invention.

It will be evident to those skilled in the art that my invention is not limited in its application to the measurement of the speed of induction-motors, but may be employed to measure the speed of any device in which alternating currents are developed of a frequency dependent upon the speed. Thus, for example, the armature of a direct-current motor may be tapped at suitable intervals and the resulting alternating current fed to one member of a synchronous motor the field of which is excited by direct current. The speed of the synchronous motor will correspond to the speed of the armature of the direct-current machine. In the same manner a synchronous motor might, as before stated, be used in place of that form of frequency-indicator illustrated in the drawings. Under such circumstances the synchronous motor would indicate simply the slip of the induction-motor rather than its actual speed. Many other modifications will suggest themselves without departing from the spirit of my invention.

What I claim as new, and desire to secure by Letters Patent of the United States, is—

1. The method of measuring the slip of an induction-motor, which consists in developing in the induced member of the motor current of a frequency proportional to the slip, supplying said current to a device having a speed of rotation proportional to the frequency of said current, and measuring the speed of said device.

2. The method of measuring the variation from synchronous speed of a rotary-field dynamo-electric machine, which consists in developing in one member of the machine an alternating current the frequency of which is proportional to said variation, transmitting said current to a device responsive thereto, and observing the indications of said device.

3. The method which consists in supplying polyphase current to one member of a dynamo-electric machine of the rotary-field type, developing in the other member of the machine a current of a frequency dependent on the variation in speed of said machine from synchronism, raising the potential of the current thus developed, transmitting the same, and supplying it to one member of a motor, supplying current to the other member of the motor and measuring the speed of its revolving member.

4. The method which consists in supplying polyphase current to one member of a dynamo-electric machine of the rotary-field type, developing in the other member of the machine a current of a frequency dependent on the variation in speed of said machine from synchronism, transmitting said current and supplying it to one member of a frequency-measuring device, the other member of which is supplied with current of the same frequency as that supplied to said dynamo-electric machine.

In witness whereof I have hereunto set my hand this 26th day of March, 1902.

ERNST J. BERG.

Witnesses:
BENJAMIN B. HULL,
HELEN ORFORD.